United States Patent [19]

Krankkala

[11] Patent Number: 4,600,739

[45] Date of Patent: Jul. 15, 1986

[54] FAST SETTING STARCH-BASED CORRUGATING ADHESIVE HAVING PARTIALLY HYDROLYZED WATER SOLUBLE POLYVINYL ALCOHOL COMPONENT

[76] Inventor: Paul L. Krankkala, 7821 Rimbley Rd., Woodbury, Minn. 55125

[21] Appl. No.: 751,462

[22] Filed: Jul. 2, 1985

Related U.S. Application Data

[63] Continuation of Ser. No. 612,359, May 21, 1984, abandoned.

[51] Int. Cl.$^4$ ............................................. C08L 3/02
[52] U.S. Cl. ........................................ 524/48; 524/53
[58] Field of Search ................. 524/48, 53; 106/213

[56] References Cited

U.S. PATENT DOCUMENTS

| | | | |
|---|---|---|---|
| 3,135,648 | 6/1964 | Hawkins | 161/249 |
| 3,371,004 | 2/1968 | Kennedy | 156/321 |
| 3,498,869 | 3/1970 | Murakami | 428/511 |
| 3,591,534 | 7/1971 | Dunholter | 260/9 |
| 3,720,633 | 3/1973 | Nickerson | 524/53 |
| 4,008,116 | 2/1977 | Sebel | 156/328 |
| 4,018,959 | 4/1977 | Demko et al. | 428/182 |
| 4,094,718 | 6/1978 | Czerwin | 156/210 |
| 4,131,581 | 12/1978 | Cuker | 260/29.1 |
| 4,240,841 | 12/1980 | DiDominicis | 106/211 |
| 4,272,295 | 6/1981 | Linke | 106/157 |
| 4,297,144 | 10/1981 | Klein et al. | 106/197 |
| 4,350,788 | 9/1982 | Shimokawa et al. | 524/309 |
| 4,359,341 | 11/1982 | Allen | 106/213 |
| 4,374,217 | 2/1983 | Miyake et al. | 524/47 |
| 4,442,252 | 4/1984 | Sumi et al. | 524/183 |
| 4,521,561 | 6/1985 | Hausman et al. | 524/503 |

FOREIGN PATENT DOCUMENTS

| | | |
|---|---|---|
| 13813 | 10/1983 | Australia . |
| 1068025 | 12/1979 | Canada . |
| 19600 | 7/1970 | Japan ............ 524/53 |
| 1514630 | 6/1978 | United Kingdom . |

OTHER PUBLICATIONS

Preparation of Corrugating Adhesives, Chapter 5, pp. 38–46.
Vol. 22, pp. 156–173 of an Unidentified Publication, Entitled "Waxes".

*Primary Examiner*—Theodore Morris

[57] ABSTRACT

Corrugating adhesives free of incompatibility problems with water soluble partially hydrolized polyvinyl alcohol comprise a major portion of water, starch, strong base, a boric acid compound and a partially hydrolized water soluble polyvinyl alcohol composition.

17 Claims, No Drawings

FAST SETTING STARCH-BASED CORRUGATING ADHESIVE HAVING PARTIALLY HYDROLYZED WATER SOLUBLE POLYVINYL ALCOHOL COMPONENT

This is a continuation of application Ser. No. 612,359, filed May 21, 1984 now abandoned.

FIELD OF THE INVENTION

The invention relates to a starch based adhesive composition that can be used to form corrugated board. More particularly the invention relates to a starch based adhesive that rapidly increases in viscosity under conditions of heat and pressure resulting in a fast-setting green bond.

BACKGROUND OF THE INVENTION

Corrugated paper board or liner board is commonly prepared by first forming a corrugated element or medium by passing a cellulosic sheet between corrugating rolls forming a substantially sinusoidal or serpentine cross-section in the sheet. An adhesive is commonly applied to the tips of the thus formed sinusoidal portion called flutes and a non-corrugated or planar cellulosic liner is applied against the adhesive coated flutes of the corrugated elements as the corrugated sheet passes between a corrugating roll and a pressure roll. The resulting paper product having the corrugating medium on one side and the planar liner on another side is called a single-faced element. The single-faced element may be used as is in certain applications as a liner or buffer material within a container. More commonly adhesive is applied to the flute tips of the single-faced element and a second liner sheet is subsequently applied to the adhesive liner in a "double facer" operation. The second liner sheet is exposed to conditions of heat and pressure during its contact with the adhesive. In a so-called "hot-plate" dryer section a continuously moving belt with a hot-plate or platen surface is used to partially remove water from the adhesive bond line and establish a cured adhesive bond at temperatures of about 300°–400° F.

The adhesives which have been developed to form the corrugated board or paper board are generally starch base adhesives. The earliest corrugating board adhesive patent, U.S. Pat. No. 2,102,937, discloses an adhesive composition comprising gelatinized starch, ungelatinized starch, alkali and borax in a water base. This adhesive has formed the basis for the manufacture of essentially all corrugated paper board to date. This adhesive is a carrier adhesive, wherein a portion of the starch forms a carrier gelatinized phase and the balance of the starch forms an ungelatinized phase. Under conditions of heat and pressure the ungelatinized starch rapidly gelatinizes, absorbs water and causes a rapid increase in viscosity and adhesivily of the starch-adhesive composition. Borax increases the level of viscosity as well during final gelatinization.

More recently a number of patents have disclosed a corrugating board adhesive that can be characterized as a conventional starch-based adhesive containing finely divided solid particles of a substantially room temperature insoluble polyvinyl alcohol. The water insoluble polyvinyl alcohol disclosed in these patents becomes soluble at an elevated temperature. A substantially insoluble polyvinyl alcohol is used in these patents since the common belief of the corrugating industry is that soluble polyvinyl alcohol will gel in the presence of borax containing starch based adhesives. The use of insoluble polyvinyl alcohol permits the use of the polyvinyl alcohol in starch based adhesives since at storage or ambient temperatures the polyvinyl alcohol, in solid form, cannot interact with starch or borax. After application to the flute tips, at conditions of high temperature and pressure, the polyvinyl alcohol can rapidly dissolve and substantially increase the viscosity and bond strength of the bond line between the corrugating medium and the liner material.

The speed at which corrugating machines can be run is limited by the rapidity of viscosity increase in the bond line between the liner and corrugated medium. As the viscosity of the adhesive rises under conditions of heat and pressure in the corrugating machine, a "green bond" is formed which holds the components together until the adhesive system forms the final heat-cured corrugated bond. The green bond relies solely on the viscosity of the product to maintain the integrity of the product during curing.

Conventional starch based adhesives rely on the response of borax and ungelatinized starch under conditions of heat and pressure to increase the viscosity of the adhesive during green bond formation. More recent corrugating adhesives containing the additionally insoluble polyvinyl alcohol utilize the increase in viscosity that results as the polyvinyl alcohol is solubilized at high temperature. However, both the conventional and the solid polyvinyl alcohol containing conventional adhesives increase viscosity at a rate that leaves substantial room for improvement. If the rate at which viscosity increase occurs in the bond line can be increased, then the corrugating machines can be run at a substantial increase in speed resulting in an increase in productivity.

Accordingly a substantial need exists for a corrugating adhesive having a faster set or a substantial increase in the rate of viscosity development or in the rate of green bond formation during the manufacture of corrugated board.

BRIEF DESCRIPTION OF THE INVENTION

We have learned that problems relating to the incompatibility of soluble polyvinyl alcohol compositions can be solved and an adhesive having a substantially improved fast set or increase in the rate of viscosity increase can be achieved by adding to a corrugating adhesive comprising starch, alkali base, boric acid and water, a controlled amount of a partially hydrolized soluble polyvinyl alcohol composition. We have found that, contrary to the teachings of the art, that the incompatibility of polyvinyl alcohol compositions can be controlled by carefully controlling the amount of polyvinyl alcohol in relation to boric acid in the final adhesive composition and by selecting a partially hydrolized polyvinyl alcohol composition. Further a selection of a preferred lower molecular weight polyvinyl alcohol can improve the compatibility of the adhesive and the polyvinyl alcohol.

While we do not wish to be held to a theory of action of the invention, we believe that the problems relating to phase separation and gelling in polyvinyl alcohol containing adhesive is directly related to an interaction between the hydroxyl groups of the starch or boric acid and hydroxyl groups of the polyvinyl alcohol. We have found that these harmful interactions can be prevented by controlling the available concentration of hydroxyl groups by controlling the concentration of polyvinyl alcohol in the solution and by selecting a partially hydrolized polyvinyl alcohol wherein a small but important proportion of the hydroxyl groups of the polyvinyl alcohol molecule remain acetylated. We have further found that in formulating corrugating adhesives with the partially hydrolized polyvinyl alcohol that there is a threshold concentration of the partially hydrolized soluble polyvinyl alcohol above which substantial gelling or incompatibility results. However, below the threshold polyvinyl alcohol acts to substantially increase fast set of the green bond or viscosity increase during corrugating boric manufacture. Since the polyvinyl alcohol is in solution, the rate of green bond formation is increased by the presence of the alcohol, but is not limited by the rate of dissolution of a solid polyvinyl alcohol. Since green bond formation is increased corrugating machine speeds can be increased proportionately. Still further we have found that the lower molecular weight polymers are more resistant to gel formation.

DETAILED DESCRIPTION OF THE INVENTION

Briefly, the novel water-resistant corrugated board adhesives of this invention are prepared by forming an aqueous emulsion, having an alkaline pH containing a soluble partially hydrolyzed PVOH, starch, a strong alkali metal hydroxide base and a boric acid compound and optionally a basically reacting crosslinking resin, and wax. The corrugated paper board adhesive of this invention is preferably formed from a suspension of starch particles in water. The viscosity and solids content are important factors influencing the speed with which the paper board machine can be operated and also effects the quality of the finished paper board. The suspending paste or carrier medium must be sufficiently viscous to maintain a smooth suspension of the starch particles, but not so viscous as to interfere with the application of the adhesive to the paper board. The nature and proportion of dissolved solids in the carrier medium influences both pot life and the speed with which a given paper stock absorbs water from the applied adhesive. The water content of the adhesive efects adhesive properties. A small degree of water absorption from the adhesive to the paper is desirable in forming strong bonds between the paper plies. Absorption of water beyond that required to give good bonding is undesirable since it robs the adhesive of water needed to complete the gelatinization of the suspended starch upon heating in the corrugator and leads to inferior bonding.

POLYVINYL ALCOHOL

Polyvinyl alcohol (PVOH), a polyhydroxy polymer having a polymethylene backbone with pendent hydroxy groups, is a water soluble synthetic resin. It is produced by the hydrolysis of polyvinyl acetate. The theoretical monomer

does not exist. Polyvinyl alcohol is one of the very few high molecular weight commercial polymers that is water soluble. It is commonly available as a dry solid and is available in granular or powdered form. PVOH grades include a "super" hydrolyzed form (99.3% plus removal of the acetate group), a fully hydrolyzed form (99%+ removal of the acetate group), a form of intermediate hydrolysis (about 98 to 91% removal of acetate group), and a partly hydrolyzed (about 91% to 85% removal of the acetate group) polyvinyl alcohol. The properties of the resins vary according to the molecular weight of the parent polymer and the degree of hydroysis. Polyvinyl alcohols are commonly produced in nominal number average molecular weights that range from about 20,000 to 100,000. Commonly the molecular weight of commercial polyvinyl alcohol grades is reflected in the viscosity of a 4 wt-% solution measured in centipoise (cP) at 20° C. with a Brookfield viscometer. The viscosity of a 4% solution can range from about 5 to about 65 cP. Variation in film flexibility, water sensitivity, ease of solvation, viscosity, block resistance, adhesive strength, dispersing power can all be varied by adjusting molecular weight or degree of hydrolysis. Solutions of polyvinyl alcohol in water can be made with large quantities of lower alcoholic cosolvents and salt cosolutes. Polyvinyl alcohols can react with aldehydes to form acetals, can be reacted with acrylonitrile to form cyanoethyl groups, and can be reacted with ethylene or propylene oxide to form hydroxy alkylene groups. Polyvinyl alcohols can be readily crosslinked and can be borated to effect gellation.

Polyvinyl alcohol is made by first forming polyvinyl acetate or a vinyl acetate containing copolymers such as an ethylene vinyl acetate copolymers and removing the acetate groups using a base catalyzed alkanolysis. The production of polyvinyl acetate or a vinyl acetate copolymer can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename VINOL ™, by duPont under the trade name ELVANOL ™, and by Monsanto under the trade name GELVITOL ™.

The preferred polyvinyl alcohol compositions for use in this invention comprise polyvinyl alcohol made from a homopolymer or interpolymer of vinyl acetate that is partially hydrolized i.e. less than about 91% of the hydroxyl groups are free of acetate. The preferred partially hydrolized polyvinyl alcohol is available in low, medium or high molecular weight variations characterized by the Brookfield viscosity of a 4 wt-% aqueous solution at 20 degrees. The low molecular weight polyvinyl alcohol has a viscosity of about 4–10 cP, the medium molecular weight composition has a viscosity of about 15–30 cP and a high molecular weight composition has a viscosity of about 35–60 cP. The preferred polyvinyl alcohol compositions have a reduced particle size adapting the composition for rapid dissolution. The particle size of the most preferred polyvinyl alcohol is such that 99+% of the product will pass through a −80 mesh screen.

The most preferred polyvinyl alcohol composition is made from a low molecular weight homopolymer of vinyl acetate that is partially hydrolyzed resulting in the removal of about 87% to 91% of the acetate groups from the vinyl acetate homopolymer.

STARCH

The starch based adhesives of this invention are commonly characterized as being either a carrier adhesive, a no carrier adhesive, or a carrier/no carrier adhesive. The term carrier adhesive implies the presence of a thin base of gelatinized starch in which ungelatinized or nonhydrated starch particles are emulsified or suspended. The term no carrier adhesive implies the substantial absence of gelatinized or hydrated starch in the adhesive emulsion. The term carrier/no carrier adhesive implies that the distinction between gelatinized starch and ungelatinized starch is not clear in the adhesive composition. Generally carrier/no carrier adhesives are prepared in a way that a substantial amount of partly hydrated or partly gelatinized starch is formed. These terms are imprecise since during the preparation of the starch based adhesives some starch inherently becomes gelatinized during processing at any temperature. However substantial proportions of starch remain ungelatinized and nonhydrated during preparation which can gelatinize and interact with PVOH, and borax during green bond formation.

The starch used in both the carrier phase and suspended starch phase is a commodity chemical produced from a number of root, stem or fruit, plant sources. Starch is a high molecular weight polymeric carbohydrate polysaccharide, most commonly composed of six carbon monosaccharide units joined by alpha-glycan linkages having an approximate molecular formula of $(C_6H_{10}O_5)_n$, wherein n equals $10^2$ to $10^6$. Starch occurs naturally in the form of white granules and comprise linear and branched polysaccharide polymers. Starch is commonly manufactured by first soaking and grinding the plant starch source, and separating the starch from waste matter. The starch is commonly reslurried and processed into a finished dried starch product. Commercial starch often has the form of a pearl starch, powdered starch, high amylose starch, precooked or gelatinized starch, etc. Preferably pearl starch is used in making both the carrier phase and the particulate starch suspended in the carrier.

BASE

The novel adhesive compositions of the invention contain a strong base which promotes the production of crosslinking species from the resin and acts to cure the adhesive. Essentially any strong base can be used, however preferred bases are alkali metal hydroxides. The most preferred strong bases include sodium and potassium hydroxide. The strong base also lowers the gel point of the starch, which increases the rate of hydration of the starch during curing of the glue line. The pH of the adhesive composition commonly ranges from about 9 to 13 and preferably from about 11 to 12. In order to obtain a pH within these ranges an amount of base, preferably sodium hydroxide, is used which falls between about 0.02 and 0.75 parts of sodium hydroxide per each 100 parts of the aqueous composition.

BORIC ACID COMPOUND

The novel adhesive compositions of the invention include a boric acid compound which cooperates with the gelatinized and nongelatinized starch during heating and curing by reacting with available hydroxyl groups of the starch, forming a starch borax complex which aids in gelling the carrier starch molecules and the suspended starch molecules. The cooperative reaction increases the tack of the adhesive and produces strong bonds. Any boric acid compound having free hydroxyl groups attached to the boron atom can be used, however commercial boric acid (orthoboric acid, $H_3BO_3$ and its hydrated forms $H_3BO_3 \cdot XH_2O$) and borax (sodium tetraborate decahydrate, $Na_2B_4O_7 \cdot XH_2O$ and other hydrate and anhydrous forms) are commonly used. For a discussion of boric acid compounds such as boron oxides, boric acids and borates, see Kirk-Othmer Encyclopedia of Chemical Technology, 2nd Edition, Vol. 3, pp. 608-652. The boric acid compound increases the tackiness, viscosity, and cohesive strength of the adhesive. As the adhesive cures in the glue line, a gel structure forms between the hydroxyl group of the polysaccharide, the basic acid compound and the PVOH. The exact mechanism of the crosslinking reaction between these compounds is unknown. Further, the borax buffers the caustic nature of the base used in the adhesive stabilizing the adhesive to the hydrolytic effect of the base.

CROSSLINKING RESINS

Resins that can be used in the novel adhesive compositions of this invention include resins that upon heating in basic media generate crosslinking species that react with and crosslink the hydroxyls in adjacent starch molecules. The crosslinking reagent tends to reduce the hydrophilic nature and the water solubility of the starch molecules by effectively removing the availability of hydroxyl groups to water and by introducing aliphatic alkylene-type crosslinking moieties.

A preferred class of crosslinking resins comprise well known condensation products of the reaction of a ketone and an aldehyde compound. These resins are characterized as a polyether polymer but can contain a variety of other monomers such as urea, melamine, etc. In the presence of heat and base, they commonly decompose to produce species that effectively crosslink the starch molecules. Preferred resins are acetone-formaldehyde resins, acetone-urea-formaldehyde resins, acetone-melamine-formaldehyde resins comprising 15 to 30 wt-% acetone, about 5 to 50 wt-% formaldehyde and 0 to 15 wt-% of third monomer. One example of the preferred crosslinking resin embodiment of this invention comprises the Ketack series of resins manufactured by American Cyanamide.

WAX

The term wax is used very broadly and is applied to a wide variety of materials. The materials can have properties resembling certain well known waxes or can be used to provide physical properties similar to those associated with well known properties of wax such as sealing, polishing, candle making, etc. Many waxy substances have been found in nature and have been known to be useful for many years.

Historically waxes include substances that are natural products. Chemically natural waxes are esters of fatty acids and monohydric fatty alcohols. Physically waxes are water repellant solids having a useful degree of plastic character. However, modern waxes include various synthetic substances that can replace natural waxes in many preparations. The composition of natural waxes generally comprise an ester of a saturated fatty acid and a long chain monohydric alcohol. Long chain fatty acids often include acids having greater than 16 carbon atoms and most commonly about 26 carbon atoms. The aliphatic monohydric alcohol commonly has at least 14 and can range as high as 36 carbon atoms. Petroleum, mineral or other synthetic waxes often consist of saturated hydrocarbons having aliphatic or open chain structures with relatively low branching or side chains.

Particularly preferable waxes for the water resistant corrugated board adhesive are waxes such as petroleum waxes, candelilla wax, beeswax, etc. Particularly preferred waxes are the petroleum waxes such as microcrystalline waxes, slack waxes and paraffin waxes.

In somewhat greater detail, the novel fast set corrugating adhesives of this invention can made by combining the ingredients in water and heating the mixture until a smooth uniform composition is formed. Preferably the adhesive is made by combining a starch slurry with a solution of the base in water heating the mixture to at least partially gelatinized the starch and then adding the remaining components under conditions of mixing to form the smooth corrugated adhesive. The adhesive can contain from about 5 to 75 parts of starch and about 0.1 to about 10 parts of base per 100 parts of the adhesive composition. In "carrier" adhesives the carrier phase comprises about 1 to 25 parts of starch and the ungelatinized phase comprises 5 to 50 parts of starch per each 100 parts of adhesive. The adhesive can contain about 0.1 to 5 parts of boric acid per each 100 parts of water and optionally about 0.1 to 5 parts of basically reacting crosslinking resin per 100 parts of water and about 0.1 to 5 parts of wax in an emulsion form per each 100 parts of water.

The fast setting adhesive of this invention contain about 0.01 to 2.0 parts of polyvinyl alcohol per each 100 parts of adhesive. Preferably the adhesive contains about 0.1 to 1.5 parts of polyvinyl alcohol and most preferably for reasons of rapid set and compatibility with the adhesive components about 0.25 to 1.25 parts of polyvinyl alcohol per 100 parts of adhesive. The ratio of polyvinyl alcohol to boric acid is important in the invention since the interaction between polyvinyl alcohol and boric acid can cause substantial gelling problems and the manufacture of the adhesive. Accordingly, polyvinyl alcohol is used in a ratio of less than 9 parts by weight of polyvinyl alcohol per each part of boric acid, preferably 1 to 8 parts of polyvinyl alcohol per part of boric acid and most preferably 2 to 7 parts of polyvinyl alcohol per each part of boric acid for reasons of obtaining a fast setting adhesive free of unacceptable component interactions.

EXAMPLE I

Into a 12000 milliliter stainless steel beaker equipped with an electrically driven blade mixer in a water bath heated to 140° F. was placed 3.336 kilograms of water. The water was permitted to reach a temperature of about 87° F. and 1.6 kilograms of pearl (corn) starch was added to the water. The contents of the beaker was mixed until uniform for 5 minutes and into the starch suspension was added slowly, drop-wise over a 10-minute period, a solution of 48 grams of sodium hydroxide in 834 grams of water. After the addition of the sodium hydroxide solution, the mixture was heated to about 94° F. resulting in a viscosity of 20 #5 Zahn cup seconds. Into the blended, smooth emulsion of starch was added 20 grams of boric acid and 200 grams of water. The resulting starch based adhesive was 27.6 wt-% solids.

EXAMPLE II

Into 1,000 grams of the adhesive composition of Example I in a 1200 milliliter stainless steel beaker equipped with an electrically driven blade mixer in a water bath heated to about 95° F. was added 12.0 grams of a 66 wt-% aqueous solution of an acetone-formaldehyde resin (0.2 mole % acetone), 4.0 grams of an aqueous 39 wt-% emulsion of slack wax, and 9.9 grams of a 15 wt-% aqueous solution of a low molecular weight (4–6 cP), partially hydrolyzed (87.0 to 89.0% hydrolysis) polyvinyl alcohol (VINOL 205-Air Products). The components were mixed until uniform.

EXAMPLE III

Example II was repeated except that the acetone formaldehyde resin and the slack wax emulsion were omitted.

TABLE 1

Rate of Bond Formation at 350° F.

| Example | Bond Time |
| --- | --- |
| I | No bond after 4 seconds |
| II | Bonded in less than 4 seconds |
| III | Bonded in less than 4 seconds |

In performing the above bond rate formation tests, the flutes of a single face liner (C-FLUTE 69# W.S.S./30 W.S. MED. single face board) are coated with 12 mils of each adhesive. The glue lines on the flutes are contacted with a liner sheet (69# W.S.S. liner sheet), and the assembly is placed liner sheet down on a hot plate at 350° F. A 3.32 kg. weight is placed on the assembly resulting in 34.95 grams per lineal inch of glue line. The assembly is checked for bond formation.

EXAMPLE IV

Example II was repeated except that the solution of the partially hydrolyzed low molecular weight polyvinyl alcohol was replaced with a series of solutions having differing concentrations of a superhydrolyzed (99.3+% hydrolyzed) medium molecular weight (22–26 cP) polyvinyl alcohol (VINOL 125-Air Products) as recorded in the following Table:

TABLE 2

| Comparative Example | Solution Polymer Concentration (wt-%) | Amount Used (Grams) | Adhesive Polymer Concentrate (wt-%) | Adhesive Response |
| --- | --- | --- | --- | --- |
| IV | 15.0 | 0.5 | 0.08 | Will not mix* |
| V | 7.5 | 0.5 | 0.04 | gelled** |
| VI | 2.5 | 0.5 | 0.02 | mixed |
| VII | 2.5 | 1.0 | 0.03 | mixed*** |
| VIII | 2.5 | 1.5 | 0.04 | mixed*** |
| IX | 2.5 | 2.3 | 0.06 | mixed*** |
| X | 2.5 | 3.0 | 0.08 | mixed*** |
| XI | 2.5 | 4.0 | 0.11 | gelled** |
| XII | 2.5 | 5.0 | 0.13 | gelled** |
| XIII | 2.5 | 6.0 | 0.16 | gelled** |

*The agitated adhesive and polymer solution interact to gell the surface of small droplets of the polymer solution.
**Polymer solution blended with the adhesive but gelled within minutes.
***Polymer solution blended with adhesive but viscosity increase occurred.

Clearly a low concentration of the super hydrolyzed material causes substantial problems.

EXAMPLE XIV

Into 1200 milliliter stainless steel beaker with an electrically driven blade mixer heated in a 140° F. water bath was placed 217 grams of water, 198.4 grams of pearl corn starch, and 1.6 grams of a low molecular weight (4-6 cP) partially hydrolyzed (87.0 to 89.0% hydrolysis) polyvinyl alcohol (VINOL 205-Air Products). The contents of the beaker were mixed until dissolution occurred at 125° F. After dissolution the mixture was agitated for 15 minutes and 200 grams of water were added. After the water addition the temperature of the mixture was less than 90° F. To the mixture was added drop-wise over a 10-minute period 110 grams of a solution of 6 grams sodium hydroxide and 104 grams of water. After the sodium hydroxide solution addition was completed the mixture was heated to 94° F. and the adhesive mixture had a viscosity of 12 #5 Zahn cup seconds. Into the agitated mixture was added 2.5 grams of boric acid. The adhesive formed a strong green bond within 3 seconds at 350° F.

EXAMPLE XV

Into a 1200 milliliter stainless steel beaker equipped with an electrically driven blade mixer in a 140° water bath was placed 217 grams of water, 197.0 grams of pearl corn starch, and 2.4 grams of a low molecular weight (4-6 cP) partially hydrolyzed (87.0 to 89.0% hydrolysis) polyvinyl alcohol (VINOL 205S-Air Products) having a reduced particle size. The mixture was heated to 108° F. for 25 minutes to solubilize the components. Into the mixture was added 200 grams of water which reduced the temperature to less than 88° F. Into the mixture was added drop-wise over a 10-minute period 110 grams of a solution of 6 grams of sodium hydroxide in 104 grams of water. After the addition the mixture was stirred until uniform and into the stirred mixture was added 2.5 grams of boric acid. The gel temperature of the adhesive was 138° F.

EXAMPLE XVI

Example XV was repeated except the polyvinyl alcohol was omitted and 200 grams of pearl corn starch was added in place of 197.6 grams of starch.

TABLE 3

| | Rate of Bond Formation | |
| --- | --- | --- |
| | Bond Time (Seconds) | |
| Temperature °F. | Example XV | Example XVI |
| 350 | 3 | 4 |
| 300 | 5 | 6 |
| 250 | 10 | 14 |

Table 3 presents the bond of rate formation of the adhesives prepared in Examples XV and XVI. Clearly the adhesive having the soluble partially hydrolyzed low-molecular weight polyvinyl alcohol formed a significant bond at a much greater rate than the adhesive having no polyvinyl alcohol. Further, during the preparation of the Examples, the fine particle size of the polyvinyl alcohol solids permitted rapid solution.

The above discussion examples and data illustrate our current understanding of the invention. However, since many variations of the invention can be made without departing from the spirit and scope of the invention, the invention resides wholly in the claims hereinafter appended.

I claim:

1. An aqueous fast-setting corrugating adhesive composition which comprises, in an aqueous emulsion, a major proportion of water, about 5 to 50 parts of starch per each 100 parts of adhesive, sufficient alkali metal hydroxide to provide an alkaline pH, about 0.1 to 5 parts of a boric acid compound per each 100 parts of water, and an effective amount of a cold water soluble, partially hydrolyzed polyvinyl alcohol composition having a degree of hydrolysis of less than about 91%, sufficient to increase the rate of green bond formation wherein the concentration of the polyvinyl alcohol composition in the adhesive composition is about 0.01 to 1.25 parts of the polyvinyl alcohol composition per 100 parts of the adhesive composition.

2. An aqueous fast-setting corrugating adhesive composition which comprises in an aqueous emulsion a major proportion of water, about 5 to 100 parts of starch, about 0.2 to 0.75 parts of an alkali metal hydroxide to provide a pH greater than about 9, about 0.1 to 5 parts of a boric acid compound, and about 0.01 to 1.5 parts of a cold water soluble, partially hydrolyzed polyvinyl alcohol composition having a degree of hydrolysis of about 87% to 91%, a particle size of less than about 80 mesh, sufficient to increase the rate of green bond formation.

3. The composition of claim 2 wherein in the aqueous emulsion the starch is in the form of 0.01 to 10 parts of gelatinized starch and 0.01 to 4 parts of ungelatinized starch each per 100 parts of the adhesive composition.

4. The composition of claim 2 wherein the ratio of polyvinyl alcohol composition to boric acid composition is less than 9:1.

5. An aqueous, fast-setting corrugating adhesive composition which comprises in an aqueous emulsion a major proportion of water, about 5 to 50 parts of starch per each 100 parts of adhesive, sufficient alkali metal hydroxide to provide an alkaline pH, about 0.1 to 5 parts of a boric acid compound per each 100 parts of water, and about 0.01 to 1.5 parts by weight of a soluble polyvinyl alcohol composition, having a degree of hydrolysis of about 91% or less per each 100 parts of adhesive, sufficient to increase the rate of green bond formation of the adhesive at temperatures below the temperature required to solubilize fully hydrolyzed polyvinyl alcohol in a corrugating adhesive.

6. The composition of claim 5 wherein the weight ratio of polyvinyl alcohol composition to boric acid composition is less than 9:1.

7. The composition of claim 5 wherein the polyvinyl alcohol composition is a low molecular weight polyvinyl alcohol wherein a 4 wt-% aqueous solution of the polyvinyl alcohol has a Brookfield viscosity of about 4-10 cP at 20° C.

8. The composition of claim 5 wherein the partially hydrolyzed polyvinyl alcohol composition has a degree of hydrolysis of about 87 to 89%.

9. The composition of claim 5 wherein the particle size of the polyvinyl alcohol is less than 80 mesh.

10. The composition of claim 5 wherein the starch is present in the form of ungelatinized starch particles suspended in a carrier phase of gelatinized starch in an aqueous emulsion wherein there are about 0.01 to 10 parts of gelatinized starch and about 0.01 to 40 parts of ungelatinized starch per 100 parts of the aqueous adhesive composition.

11. The composition of claim 5 wherein the pH of the aqueous adhesive composition is between 9 and 13.

12. The composition of claim 5 wherein the pH of the aqueous adhesive composition is between 11 and 12.

13. The composition of claim 5 wherein the alkali metal hydroxide is sodium hydroxide which is present at a concentration of about 0.02 to 0.75 parts by weight per 100 parts of the adhesive.

14. The composition of claim 5 wherein the boric acid compound is $H_3BO_3 \cdot XH_2O$ or $Na_2B_4O_7 \cdot XH_2O$, wherein X is a number from 0 to 10, which is present in the aqueous adhesive composition at a concentration of about 0.1 to 5 parts by weight per each 100 parts of the adhesive.

15. The method of making corrugated board comprising joining a corrugating medium to at least one liner using the adhesive of claim 5.

16. The product of the method of claim 15.

17. An aqueous, fast setting corrugating adhesive composition which consists essentially of, in a silicate-free aqueous emulsion, a major proportion of water, about 5 to 50 parts of starch per each 100 parts of adhesive, about 0.2 to 0.75 parts by weight of sodium hydroxide per each 100 parts of the adhesive, about 0.01 to 1.5 parts by weight of a cold water soluble polyvinyl alcohol composition having a degree of hydrolysis of about 87 to 89%, wherein the particle size of the polyvinyl alcohol is less than about 80 mesh, about 0.1 to 5 parts of a boric acid compound per each 100 parts of water, wherein the starch is present in the form of an ungelatinized starch phase suspended in a carrier phase of gelatinized starch in an aqueous emulsion having about 0.1 to 10 parts of gelatinized starch and about 0.01 to 40 parts of ungelatinized starch, wherein the polyvinyl alcohol composition is a low molecular weight polyvinyl alcohol which is a 4 wt-% aqueous solution has a Brookfield viscosity of about 4–10 cP at 20° C.

* * * * *

UNITED STATES PATENT AND TRADEMARK OFFICE
CERTIFICATE OF CORRECTION

PATENT NO. : 4,600,739

DATED : July 15, 1986

INVENTOR(S) : PAUL L. KRANKKALA

It is certified that error appears in the above-identified patent and that said Letters Patent is hereby corrected as shown below:

On the title page, add Item /73/   --Assignee: H. B. Fuller
     Company, St. Paul, Minnesota--
Column 1, line 57, for "adhesivily" read --adhesivity--.
Column 3, line 13, for "boric" read --board--.
Column 3, line 42, for "efects" read --affects--.
Column 4, lines 7-8, for "hydroysis" read --hydrolysis--.
Column 7, line 17, for "gelatinized" read --gelatinize--.
Column 8, line 40, for "Example II" read --Example I--.
Column 12, line 16, for "is" read --in--.

Signed and Sealed this

Sixteenth Day of December, 1986

Attest:

DONALD J. QUIGG

Attesting Officer  Commissioner of Patents and Trademarks